United States Patent
Ebina et al.

[11] Patent Number: 5,912,103
[45] Date of Patent: Jun. 15, 1999

[54] PHASE CHANGE OPTICAL RECORDING MEDIUM

[75] Inventors: Atsushi Ebina; Kasumi Adachi, both of Hino, Japan

[73] Assignee: Teijin Limited, Osaka, Japan

[21] Appl. No.: 08/760,372

[22] Filed: Dec. 4, 1996

[30] Foreign Application Priority Data

Dec. 11, 1995 [JP] Japan .................... 7-321658

[51] Int. Cl.$^6$ ...................... G11B 11/00
[52] U.S. Cl. ............ 430/270.13; 430/945; 369/275.2; 369/275.5; 369/288; 428/64.6; 428/913; 428/914
[58] Field of Search ................ 430/270.13, 945; 369/275.2, 275.5, 288; 428/64.6, 913, 914

[56] References Cited

U.S. PATENT DOCUMENTS

| | | | |
|---|---|---|---|
| 4,849,304 | 7/1989 | Uchiyama et al. | 428/694 |
| 5,479,382 | 12/1995 | Nishida et al. | 369/275.2 |
| 5,580,632 | 12/1996 | Ohkawa et al. | 430/270.13 |

FOREIGN PATENT DOCUMENTS

| | | | |
|---|---|---|---|
| 0376700 | 7/1990 | European Pat. Off. . | |
| 0626682 | 11/1994 | European Pat. Off. . | |
| 0630007 | 12/1994 | European Pat. Off. . | |
| 0637017 | 2/1995 | European Pat. Off. . | |
| 63-285738 | 11/1988 | Japan . | |
| 3-207037 | 9/1991 | Japan . | |
| 4-143937 | 5/1992 | Japan | G11B 7/24 |
| 4-74785 | 11/1992 | Japan | G11B 7/24 |
| 5-234130 | 8/1993 | Japan . | |
| 6-139615 | 5/1994 | Japan | G11B 7/24 |
| 7-307036 | 11/1995 | Japan | G11B 7/24 |

OTHER PUBLICATIONS

Database WBI Section Ch, Week 9329 Derwent Publications Ltd., London GB; Class A89, AN 93–229582 XP002027923 & JP 05 151 617 A (Matsushita Elec Ind Co Ltd), Jun. 18, 1993 *abstract*.

Database WPI Section Ch, Week 9550 Derwent Publications Ltd., London, GB; Class G06, AN 95–386883 XP002027925 & JP 07 262 612 A (Toshiba KK), Oct. 13, 1995 *abstract*.

Database WPI Section Ch, Week 9251 Derwent Publications Ltd., London, GB; Class G06, AN 92–420553 XP002027924 & JP 04 316 887 A (Matsushita Elec Ind Co Ltd), Nov. 9, 1982 *abstract*.

Patent Abstracts of Japan, vol. 018, No. 445 (P–1789), Aug. 18, 1994 & JP 06 139615 A (Hoya Corp), May 20, 1994.

Ohta et al. "Effect of Laser Pulse Width on Overwrite Cycle Chracteristics of Phase Change Disk Media" SPIE vol. 1663 Optical Data Storage (1992) pp. 436–442.

Patent Abstracts of Japan vol. 016, No. 424 (P–1415), Sep. 7, 1992 & JP 04 143937 A (NEC Corp), May 18, 1992.

Patent Abstracts of Japan vol. 95, No. 011 & JP 07 307036 A (Asahi Chem Ind Co Ltd), Nov. 21, 1995.

*Primary Examiner*—Martin Angebranndt
*Attorney, Agent, or Firm*—Sughrue, Mion, Zinn, Macpeak & Seas, PLLC

[57] ABSTRACT

A phase change optical recording medium in which writing, reading and/or erasing of information is conducted by utilizing change of phase of a recording layer by irradiation of a light beam, said recording medium comprising a substrate, a first transparent protecting layer of an amorphous dielectric material on the substrate, a recording layer of a chalcogen alloy on the first transparent protecting layer, an adhesive layer of a crystalline sulfide 10 to 30 nm thick on the second recording layer, a second transparent protecting layer of an amorphous dielectric material on the adhesive layer, and a reflection layer of a crystalline alloy mainly comprising aluminum on the adhesive layer.

8 Claims, 1 Drawing Sheet

PHASE CHANGE OPTICAL RECORDING MEDIUM

BACKGROUND OF THE INVENTION

1. Field of the Invention

The present invention relates to an optical recording medium for writing and reading information with light, particularly a phase change optical recording medium.

2. Description of the Related Art

The phase change optical recording medium utilizes, for recording information, a reversible structural change (phase change) between an amorphous state and a crystalline state of a material created by irradiation of light, particularly a laser beam. Such a phase change optical recording medium may have a high information processing rate and a high recording capacity.

As a result, a phase change optical recording medium with performance of a high speed erase and rewrite of written information in pratical use has been sought. To attain this, it is essential to have stable repeated overwrite operation. Overwriting means writing new information over previously written information while it is being erased. It is preferred that the possible number of times of erase and write is high.

A phase change optical recording medium is commercially available as a rewritable optical disc. For example, a 120 mm phase change optical recording disc is commercially available. A typical disc comprises a stack structure of a polycarbonate substrate, a first transparent dielectric layer of $ZnS.SiO_2$, a phase change recording layer of GeSbTe, a second transparent dielectric layer of $ZnS.SiO_2$, a reflection layer of an Al alloy and a UV-cured organic resin coated layer in this order.

The levels of erase and overwrite repetition durability of these commercially available discs are practically acceptable, but it is still desired that this repetition durability is further improved from the viewpoint of the reliability of the products. It is also desired that the erase and overwrite repetition durability is further improved from the viewpoint of the yield of production since the durability is largely influenced by the conditions of production such as sputtering conditions.

Further, since a high density overwrite disc which is now under development uses mark edge recording method, deterioration of the recording layer by repeated overwriting significantly adversely affects the quality of the signal and the overwrite repetition durability is important.

It is known that the repeating overwrite characteristics are influenced by various properties of the materials of a recording layer and a protecting layer. Thus, the following materials, for example, have been developed as the materials for a protecting layer: non-oxides such as an Al nitride, a Si nitride, $MgF_2$ and $AlF_3$, oxides such as $SiO_2$, $Al_2O_3$, $ZrO_2$ and $TiO_2$, chalcogenides such as ZnS, mixtures of a chalcogenide and an oxide such as a mixture of $ZnS.SiO_2$, and the like. These materials are deposited as a thin layer by a known method and are used as protecting layers but the obtained discs do not allow a sufficient number of repetitions of overwriting.

The present invention aims to improve the above repetition durability.

The protecting layer of a phase change optical recording medium must be excellent in heat resistance and mechanical properties, since it is subjected to thermal and mechanical loads during write and erase, anid also must have a function of protecting the recording layer during storage of the optical medium. Further it must have a low thermal conductivity from the viewpoints of recording sensitivity and repetition durability.

The protecting layer of an oxide or nitride has a weak adhesive force with a recording layer comprising a chalcogen. As a result, during storage in a high temperature and humidity environment, the protecting layer may be peeled off or cracks may be formed in the protecting layer. Partly due to weakness in adhesive force between the protecting layer and the recording layer, heat supplied to the recording layer from a laser beam is not dissipated at an appropriate rate and the recording marks are connected with each other in which the material may flow in a direction, resulting in reduction in the number of erase and overwrite repetition.

Some methods have been proposed to improve the erase and overwrite repetition property. For example, Japanese Unexamined Patent Publication (Kokai) No. 6-139615 reported that provision of an adhesion promoting layer of $Al_2O_3$, $GeO_2$, $SiO_2$, $Ta_2O_5$, $Y_2O_3$, or the like between a protecting layer and a reflection layer and/or between a protecting layer and a recording layer improves the number of erase and overwrite repetition. Japanese Unexamined Patent Publication (Kokai) No. 4-143937 reported that adoption of a ceramic protecting layer with high heat resistance and mechanical properties improved the repetition durability and provision of a ZnS anchoring layer on both sides of a recording layer improved the long Lime storage stability. Japanese Unexamined Patent Publication (Kokai) No. 7-307036 proposed a protecting layer with a dual layer structure comprising a second protecting layer of a low thermally conductive mixture of ZnS and an oxide in contact with the recording layer and a third protecting layer of a high Young's modulus in contact with the reflection layer.

It is supposed that these provide improvements to some extent. However, in accordance with the investigation by the inventors, the improvement in the number of erase and overwrite repetition is not sufficient.

In accordance with the investigation by the inventors, the following conditions must be met to have a sufficient erase and overwrite repetition durability: (1) The wettability between an adhesion promoting layer and a recording layer of a chalcogenide which is fused and made amorphous for write must be excellent, and the adhesion promoting layer must not be deteriorated by repeatedly exposed high temperature. (2) The layers must have a sufficient adhesion with each other. (It is supposed that the adhesion is low between crystalline layers due to misalignment of crystal lattice spacings and the adhesion may be rather higher between an amorphous layer and a crystalline layer. Here, the term "amorphous" means that, by the X ray diffraction, the diffraction spectrum does not have definite peaks while broad spectrums having a full width half maximum of about 5 degrees or more may exist.) (3) The adhesion of the adhesion promoting layer with the reflection layer must be excellent. In the prior art, only the adhesion of the adhesion promoting layer with the recording layer is considered but the adhesion of the adhesion promoting layer with the reflection layer is often not considered, which is one of the reasons why a sufficient erase and overwrite repetition durability was not obtained.

Also, since an excess laser power may deteriorate the repetition durability, the heat conduction coefficients of the adhesion promoting layer and the protecting layer must be sufficiently small, in order to have a sufficient recording sensitivity at a low laser power which is required for a practical disc medium.

From these requirements the above reports and proposes of the prior art may be considered as below:

Japanese Unexamined Patent Publication (Kokai) No. 6-139615 adopts an adhesion promoting layer of an oxide. It is considered that a chalcogen-containing recording layer has a low affinity with an oxide and therefore does not have a sufficient adhesion with the oxide adhesion promoting layer. Even if adhesion between an oxide adhesion promoting layer and a non-fused recording layer is excellent, the wettability between an oxide adhesion promoting layer and a recording layer fused during writing is low, which results in repellence and flow of the fused material of the recording layer and results in insufficient repetition durability of the disc. It is also supposed that one of the reasons for the insufficient repetition durability is a lack of consideration of the heat resistance of the protecting layer, which causes change in the crystallinity of the protecting layer by repeated heating and thus deterioration of the repetition durability.

Japanese Unexamined Patent Publication (Kokai) No. 4-143937 reported that a ceramic protecting layer with high mechanical properties improved the repetition durability. However, the ceramic protecting layer is considered not to have a sufficient adhesion with the reflection layer and the thermal conduction of the protecting layer is not considered. Further, an anchoring layer of ZnS with a thickness of only 50 nm may improve the long time storage stability but does not have an effect in improving the repetition durability due to a change in crystallinity by repeated heating.

Japanese Unexamined Patent Publication (Kokai) No. 7-307036 uses a protecting layer with a high Young's modulus in contact with a reflection layer, but the adhesion between the reflection layer and the protecting layer is not considered, and the wettability between the the protecting layer in contact with the recording layer and e recording layer is not considered to be sufficient.

A protecting layer of mixture of a chalcogenide such as ZnS and an oxide such as $SiO_2$ has a low thermal conduction and improved the repetition durability to some extent (Japanese Examined Patent Publication (Kokoku) No. 4-74785). JPP'785 mentioned that a medium comprising a ZnS protecting layer has excellent initial characteristics but a poor erase and write repetition durability, and the reason for improvement of the durability by addition of $SiO_2$ to ZnS is not clear but is considered that addition of $SiO_2$ makes the layer amorphous and reduces the thermal conduction, which improves efficiency of temperature elevation of an optically active layer, or a recording layer, by a supplied laser power. According to JP'036, ZnS has an excellent initial adhesion with a recording layer of a chalcogen alloy such as GeSbTe, but has a poor durability since crystal grain growth is caused by repeated erase and write. It is described that addition of $SiO_2$, makes the layer amorphous and improves the repetition durability.

However, according to the investigation by the present inventors, only a layer of $ZnS.SiO_2$ does not provide a sufficient overwrite repetition durability. The reason is considered as below: Addition of $SiO_2$ adversely affects the wettability with a chalcogen alloy recording layer as GeSbTe, which is not preferable for improvement in the repetition durability. That is, the amount of $SiO_2$ added to a $ZnS.SiO_2$ mixture layer must be determined on a delicate balance and the tolerance range thereof is narrow, which not only makes the productivity low but also is the reason why a sufficient repetition durability is not exhibited.

The object of the present invention is to solve the above problems and to provide a phase change optical recording medium with an improved adhesion between the protecting layer and the recording layer and without peeling of a layer, formation of cracks and flow of the recording layer.

SUMMARY OF THE INVENTION

The phase change optical recording medium of the present invention resides in a medium in which writing, reading and/or erasing of information is conducted by utilizing change of phase of a recording layer by irradiation with light or scanning with a light beam, said recording medium has a basic construction comprising a substrate, a first protecting layer, a recording layer, an adhesion promotion layer, a second protecting layer and a reflection layer, said first and second protecting layers being transparent amorphous dielectric layers, said recording layer being a chalcogen alloy layer, said adhesion promoting layer being a crystalline layer of a sulfide and having a thickness of 10 to 30 nm, said reflection layer being a crystalline alloy layer comprising mainly aluminum.

DESCRIPTION OF THE PREFERRED EMBODIMENTS

Figure 1:
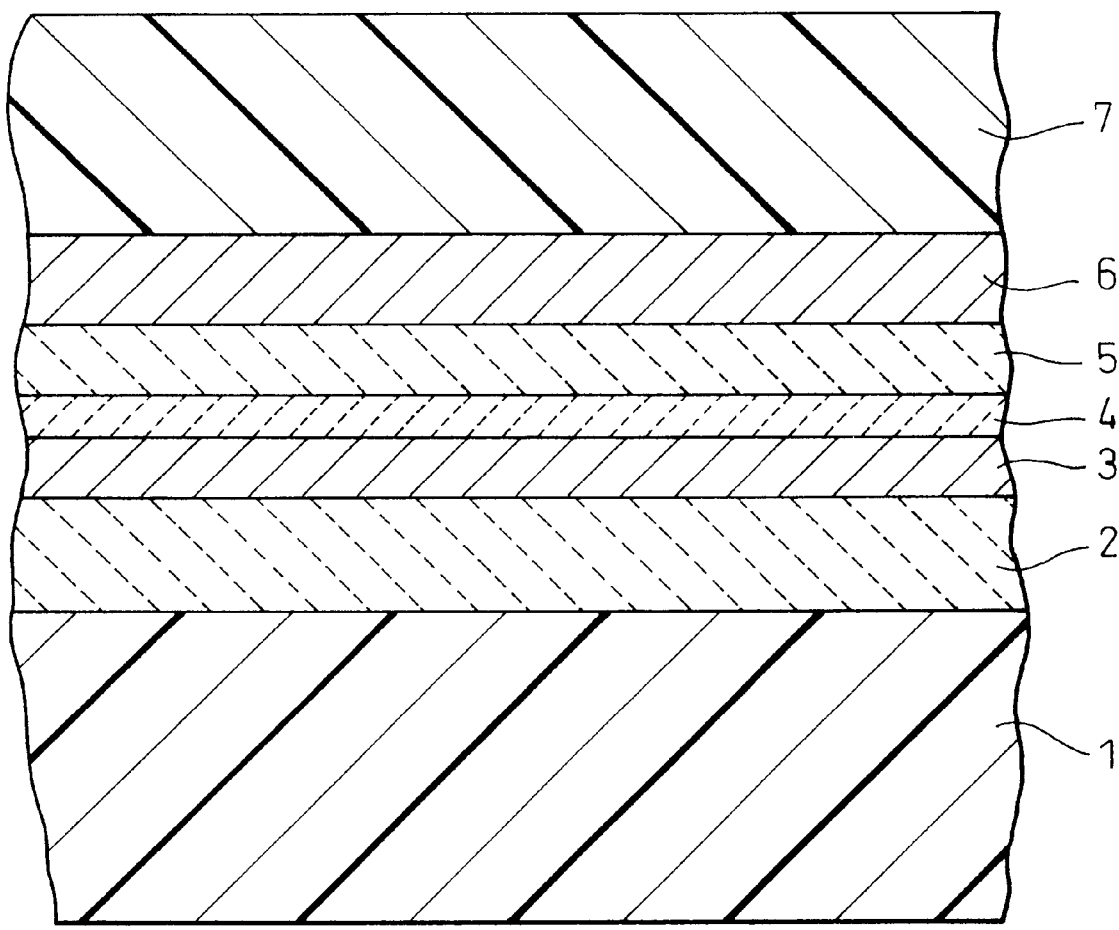
FIG. 1 is a cross-section of a phase change optical recording medium of the present invention.

As a result of vigorous investigation by the tile present inventors in accordance with the above described considerations, it was found that adoption of a laminate structure of an adhesion promotion layer of a sulfide, typically ZnS, having a thickness of not more than 30 nm and a protecting layer, typically $ZnS.SiO_2$, provides a sufficient repetition durability while allowing a maximum wettability of the adhesion promotion layer with the recording layer, that is, make it possible to simultaneously have both the heat resistance of the layer itself and the affinity of the layer with the recording layer which are considered competent or inconsistent with each other. It is considered to be because if the thickness of a ZnS layer is not more than 30 nm, the crystal growth due to repeated heating, as mentioned above, can be negligible or less than the practical problem level. Moreover, if the thickness of a ZnS layer is not more than 30 nm, the layer stress is small and peeling of the layer and formation of cracks do not occur. Further, in this construction, the adhesion between the adhesion promotion layer and the protecting layer and the adhesion between the protecting layer and the reflection layer of an Al alloy are simultaneously excellent. This is advantageously attained by a combination of a crystalline adhesion promotion layer, an amorphous protecting layer and a crystalline reflection layer. That is, in the present invention, laminations or contacts of a crystalline layer and an amorphous layer provide sufficient adhesion, while a lamination of two crystalline layers may cause peeling due to misalignment of the lattice spacing unless the lattice spacings of the two crystalline layers are completely the same.

In the phase change optical recording medium of the present invention, an optical recording medium without peeling of the layer, formation of cracks or flow of the recording layer can be provided by use of a sulfide having a high adhesion with a chalcogen-containing recording layer as an adhesion promotion layer, but the thickness of the adhesion promotion layer must be in a range of 10 to 30 nm. If the thickness of the adhesion promotion layer is less than 10 nm, the adhesion between the recording layer and the protecting layer is insufficient and the effect of improving the erase and write repetition durability is not significant. If the thickness of the layer is more than 30 nm, the deterioration of the layer due to crystal grain growth of the layer by repeated overwrite, as described before, appears. Also, if the thickness of the layer exceeds 30 nm, the layer stress becomes larger, disadvantageously tending to occur peeling of the layer and formation of cracks and resulting in a medium without a suitable sensitivity or reflection.

The chalcogen-containing recording layer of the present invention is preferably a recording layer mainly comprised of Ge, Sb and Te which is excellent in repeated erase arid write characteristics. Here, a recording layer mainly comprised of Ge, Sb and Te means that the total of the amounts of Ge, Sb and Te is 90% by atom or more based on the recording layer. The recording layer preferably has a thickness of 5 to 40 nm, more preferably 20 to 30 nm. If the thickness of this layer is less than 5 nm, sufficient recording characteristics are not obtained. If the thickness of this layer is more than 40 nm, the recording sensitivity may be insufficient or the recording layer tends to flow resulting in deterioration of the repetition durability.

The adhesion promotion layer in contact within the chalcogene-containing recording layer, preferably a Ge, Sb and Te-containing layer, is a crystalline layer of a sulfide having a thickness of 10 to 30 nm. To be a sulfide layer it is necessary to have a sufficient adhesion with the recording layer. The sulfide includes ZnS and PbS, but ZnS is particularly preferred since it is excellent in transparency and adhesion with the recording layer. The thickness of the adhesion promoting layer should be in a range of 10 to 30 nm. If the thickness of the adhesion promotion layer is less than 10 nm, the effect of improving the adhesion is insufficient, and if the thickness of the layer is more than 30 nm, the repetition durability is deteriorated.

The protecting layer is a transparent dielectric layer in an amorphous state having a suitable refractive index, typically 1.8 to 2.6. Here, the term "a layer in an amorphous state" means that the layer does not have definite diffraction peaks in a diffraction spectrum chart by the X ray diffraction method used as a crystal analysis method, but it is acceptable that broad spectrums having a full width half maximum of about 5 degrees or more appear in a diffraction spectrum chart with the abscissa being 2θ. By the amorphous state of the adhesion promotion layer, both the adhesions with the sulfide adhesion promotion layer and within the Al alloy reflection layer are simultaneously excellent. Such a protecting layer may be of a material in which about 10 to 30 mole % of an oxide such as $SiO_2$, $GeO_2$, $SnO_2$ and $In_2O_3$ or a nitride such as $Si_3N_4$ is added to a crystalline metal chalcogenide such as ZnS, ZnSe, ZnTe, PbS and PbTe.

Particularly, a material mainly comprised of ZnS to which an oxide is added is preferable since it is excellent in transparency, has a small layer stress and is excellent in adhesion with the adhesion promotion layer. Further, if the above oxide is $SiO_2$, the effect of making it amorphous is great, the thermal condition is small and the material cost is low and therefore it is particularly preferable.

Here, the amount of $SiO_2$ added to ZnS is preferably 12 to 35% by mole and particularly around 20% by mole of $SiO_2$ is most effective as a protecting layer. If the amount of $SiO_2$ is less than 12% by mole, the effect of making it amorphous is small and the layer stress is large. If the amount of $SiO_2$ is more than 35% by mole, disadvantageously the refractive index becomes small, the recording sensitivity is lowered and the overwrite durability is deteriorated. At about 20% by mole of $SiO_2$, the protecting layer is most effective from the viewpoints of the optical properties, the recording sensitivity and the repeated overwrite durability.

The thickness of the protecting layer is preferably 50 to 250 nm for the first protecting layer and 5 to 100 nm for the second protecting layer. If the first protecting layer has a thickness less than 50 nm, heat supplied to the recording layer damages the substrate. If the first protecting layer has a thickness more than 250 nm, a sufficient heat is not transferred to the recording layer and the recording characteristics are lowered. If the second protecting layer has a thickness less than 5 nm, heat given to the recording layer is easily dissipated through the reflection layer and the recording sensitivity becomes insufficient. If the second protecting layer has a thickness more than 100 nm, heat given to the recording layer is not dissipated outside and the recording layer is easily deteriorated.

The reflection layer of the present invention is mainly comprised of aluminum. The term "mainly comprised of aluminum" means at least 90% by atom of aluminum in the reflection layer. If this reflection layer is not provided, the C/N is lowered. Aluminum is preferable since it has a high reflectance, is excellent in corrosion resistance (and therefore gives storage stability of the medium), and is low in the material cost. An additive such as Cr, Ta, Ti, Au or the like may be added to lower the thermal conductivity of the Al-containing reflection layer. Particularly Cr is also excellent from tale viewpoint of corrosion resistance. Accordingly, a reflection layer mainly comprised of Al and Cr, i.e., containing 90% by atom or more of the total of Al and Cr is more preferable.

However, if the amount of the additive is too high, the reflectance is significantly lowered and the recording sensitivity becomes too high in comparison with the Al reflection layer. Therefore the material and amount of the additive should be selected so as to provide excellently balanced effects. Particularly, addition of Cr in an amount of 1 to 5% by atom, particularly about 3% by atom is most effective from the viewpoints of the reflectance and thermal conduction coefficient.

The thickness of the reflection layer is preferably 30 to 250 nm. If the thickness of the layer is less than 30 nm, the corrosion resistance is lowered and if the thickness of the layer is more than 250 nm, the recording sensitivity becomes low.

The substrate is typically made of a plastic. A polycarbonate substrate is excellent since it has excellent in mechanical properties and has a lower humidity absorption in comparison with other plastics.

A resin layer may be formed on the reflection layer to protect the medium from the environment. This resin protecting layer may be made of ultra violet ray-curable resin such as epoxy resins, acrylates, methacrylates and the like.

The medium comprises, on the plastic substrate, in the order of the first protecting layer, the recording layer, the adhesion promotion layer, the second protecting layer, the reflection layer, and the resin protecting layer. These layers from the first protecting layer to the reflection layer may be deposited successively and, if necessary, in a vacuum deposition system such as a sputtering system.

The adhesion promotion layer is required to be in contact with the recording layer and with the protecting layer of the reflection layer side. This is because the deterioration by the repeated overwrite is significantly influenced by the states (peeling etc.) of the interface between the recording layer and the reflection layer. An adhesion promoting layer inserted between the recording layer and the first protecting layer hardly had the desired effect and some times deteriorated the durability. The reason for this is considered to be that the total thickness of the first protecting layer and the adhesion promotion layer becomes too large, the layer stress becomes too large and the balance of the optical properties becomes worse.

In accordance with the phase change optical recording medium of the present invention, the repeated erase and write or overwrite operation can be conducted stably for a longer time.

EXAMPLES

Examples 1 to 5 and Comparative Examples 1 to 3

Phase change optical recording media having a structure of a transparent substrate (1)/a first transparent dielectric protecting layer (2)/a recording layer (3)/an adhesion promoting layer (4)/a second transparent dielectric protecting layor (5)/a reflection layer (6)/a UV-cured resin protecting layer (7) were manufactured, except that the medium of Comparative Example 1 did not have an adhesion promotion layer (4).

The transparent substrate (1) used was a substrate used for a 1.5 G byte-capacity phase change medium (a 130 mm diameter phase change optical disc medium used with an optical drive LF-7300J1, sold by Matsushita Electric Industry Co., Ltd.). This substrate was of a polycarbonate and had a track pitch of 1.2 $\mu$m and a groove width of about 0.6 $\mu$m, recording being made in the grooves.

The first transparent dielectric protecting layer (2) was an amorphous $ZnS-SiO_2$ layer ($ZnS:SiO_2=80:20$ by atom) with a thickness of 170 nm. The recording layer (3) was a $Ge_2Sb_2Te_5$ alloy layer with a thickness of 25 nm. The adhesion promotion layer (4) was a crystalline ZnS layer. The second transparent dielectric protecting layer (5) was an amorphous $ZnS-SiO_2$ layer ($ZnS:SiO_2=80:20$ by mole) with a thickness of 20 nm. The reflection layer (6) was an AlCr alloy layer (Al:Cr=97:3 by mole) with a thickness of 100 nm. The UV-cured resin protecting layer (7) had a thickness of 2 $\mu$m. The recording layer (3) was formed on the transparent substrate (1) by magnetron sputtering. The sputtering device used was In-Line Sputter ILC 3102-type manufactured by ANELVA Corporation, the target being 8 inches diameter, and the substrate was rotated during deposition.

In Examples 1 to 5 and Comparative Examples 1 to 3, the thickness of the adhesion promoting layer (4) was varied in a range of 0 to 35 nm by changing the time of sputtering.

Using the samples of the phase change optical recording media thus manufactured, write, read and erase were carried out as below: The phase change optical medium was loaded on a optical disc drive unit (LF-7300J1-type Drive manufactured by Matsushita Electric Industry Co., Ltd). The medium was rotated at 2400 rpm. With a semiconductor laser having a wavelength of 780 nm, overwrite of a signal 1.5T was repeated 200,000 times using a peak power of 20 mW and a bias power of 10 mW. Reading was carried out using a read power of 1.5 mW after 200,000 times overwrite and the reproduced signal wave shape was observed. The track used for evaluation was a track near track No. 25500 of the innermost data zone at a radius of about 32 mm. The characteristics or extraordinariness such as peeling, flow, etc. of the recording layer were evaluated as below:

It was found that a change or an extraordinariness often appears at a signal VFO1 where 1.5T signals were repeatedly overwritten and it was concluded that this caused the phenomenon of a flow of the layer. The signal VFO1 portion was provided at a connection portion after a Gap portion which followed an address signal part (ID part) formed by prepit in each sector of the disc. This portion (VFO1) was a portion where a shortest mark was overwritten each write time for synchronization.

The reproduced signal wave shape was observed by a digital oscilloscope with the ordinate of the voltage and the abscissa of the time. In this case, the amplitude of the reproduced signal wave shape in the direction of the ordinate corresponds to a difference of reflectance derived from reversible structural change between amorphous and crystalline states of the material of the layer made by scanning of a laser beam. The abscissa is the axis of time corresponding to the location in the disc. In the case of normal reproduced signal, the wave shape was stable showing a fixed voltage (reflective index) for each of crystalline and amorphous states. If the recording layer of the disc was normal, there was no change before and after the repetition test. If peeling of the layer, formation of cracks or a flow of the material of he layer occurred by repeated overwrite, extraordinariness or changes appeared at the envelope of the reproduced signal when the reproduced signal was observed by the oscilloscope. An extraordinary peak appeared at an envelope where it should have been flat if the layer was normal. This extraordinary peak appeared near the Gap portion and moved in the direction of the time axis toward a later time position (the afterward position of the disc being rotated) as the number of the overwrite repetition increased.

This movement of the extraordinary peak corresponds to the flow phenomenon of the fused material of the recording layer during write. The distance of the movement of the extraordinary peak was called as "shift of peak" and was used as the basis for evaluating the durability. That is, the distance of the extraordinary peak from the backward end of the Gap portion (the starting point of VFO1) after 200,000 times of overwrite which is represented as the time in $\mu$ sec determined by the digital oscilloscope, was used as the basis of the evaluation. The smaller the peak shift is, the lesser the flow of the layer is, i.e., the better it is. When the amount of the peak shift is more than 15 $\mu$ sec, it is disadvantageous since VFO does not substantially perform the original function thereof.

The bit error rate after 200,000 times of overwrite was also evaluated. The evaluation of the bit error rate was carried out by reading the 1.5T signal in an innermost data zone after 200,000 times overwrite of 1.5T signal and 4T signal. The 1.5T and 4T signals are defined as the shortest and longest signals with a single frequency between written marks in the (2,7) modulation recording method, respectively. The abbreviation "T" stands for the data bit period.

Table 1 shows the thicknesses of the adhesion promoting layers and the results of the evaluation after 200,000 times of overwrite.

In Examples 1 to 5, no deformation of reproduced signal wave shape due to peeling of the layer or formation of cracks was seen, the peak shift due to a flow of the recording layer was as small as not more than 15 $\mu$ sec, and the bit error rate was as small as not more than $9/10^6$ ($9 \times 10^{-6}$).

In Comparative Examples 1 to 3, deformations of reproduced signal wave shape due to peeling of the layer or formation of cracks were observed, the peak shift due to a flow of the recording layer was as high as more than 15$\mu$ sec, and the bit error rate was as high as more than $8/10^5$.

TABLE 1

| Disc No. | Thickness of adhesion promotion layer (nm) | Evaluation after $2 \times 10^5$ times Peak shift ($\mu$ sec) | bit error rate | Deformation of reproduced wave |
|---|---|---|---|---|
| Co. Ex. 1 | — | 20 | $8/10^5$ | present |
| Co. Ex. 2 | 5 | 18 | $8/10^5$ | present |
| Ex. 1 | 20 | 4 | $4/10^6$ | none |
| Ex. 2 | 10 | 10 | $8/10^6$ | none |
| Ex. 3 | 15 | 7 | $6/10^6$ | none |
| Ex. 4 | 25 | 10 | $7/10^6$ | none |
| Ex. 5 | 30 | 13 | $9/10^6$ | none |
| Co. Ex. 3 | 35 | 20 | $8/10^5$ | present |

From the results as shown in Table 1, it was seen that an excellent characteristics were obtained when the thickness of the adhesion promotion layer was in a range of 10 to 30 nm. When the thickness of the adhesion promoting layer was less than 10 nm, the adhesion between the protecting layer and the recording layer was not increased so that peeling of the layer, formation of cracks and a flow of the recording layer occurred and that the effect of improving the overwrite repetition characteristics was not obtained. When the thickness of the adhesion promotion layer was more than 30 nm, the layer stress of the adhesion promotion layer itself was increased so that peeling of the layer, formation of cracks or a flow of the recording layer occurred and that the overwrite repetition characteristics was not improved.

EXAMPLE 6

A phase change optical recording medium having the structure of a transparent substrate (1)/a first transparent dielectric protecting layer (2)/a recording layer (3)/an adhesion promotion layer (4)/a second transparent dielectric protecting layer (5)/a reflection layer (6)/a UV-cured resin protecting layer (7) was manufactured as in Examples 1 to 5 except that the adhesion promotion layer was of a crystalline PbS and had a thickness of 20 nm.

The evaluation was conducted as in Examples 1 to 5.

As a result, no deformation of reproduced signal wave shape due to peeling of the layer or formation of cracks was seen, the peak shift due to a flow of the recording layer was as small as 7 $\mu$ sec, and the bit error rate was as small as $8/10^6$.

Thus, the results were as excellent as those of the ZnS adhesion promotion layer. However, the PbS layer had a slight coloring and it seemed that ZnS was more excellent than PbS.

EXAMPLE 7

A phase change optical recording medium having the structure of a transparent substrate (1)/a first transparent dielectric protecting layer (2)/a recording layer (3)/an adhesion layer (4)/a second transparent dielectric protecting layer (5)/a reflection layer (6)/a UV-cured resin protecting layer (7) was manufactured as in Example 1 except that the first and second protecting layers were of an amorphous ZnS.SiN. The amorphous ZnS.SiN protecting layers were formed by radio frequency sputtering with a sintered target of ZnS.SiN (ZnS:$Si_3N_4$=70:30% by mole) in an Ar atmosphere.

The evaluation was conducted as in Examples 1 to 5.

As a result, no deformation of reproduced signal wave shape due to peeling of the layer and formation of cracks was seen, the peak shift due to a flow of the recording layer was as small as less than 6 $\mu$ sec, and the bit error rate was as small as $9/10^6$.

Thus, the results for ZnS.SiN were as excellent as those of the ZnS.$SiO_2$.

Comparative Example 4

A phase change optical recording medium having the structure of a transparent substrate (1)/a first transparent dielectric protecting layer (2)/a recording layer (3)/an adhesion promotion layer (4)/a second transparent dielectric protecting layer (5)/a reflection layer (6)/a UV-cured resin protecting layer (7) was manufactured as in Example 1 except that the first protecting layer was a crystalline ZnS layer with a thickness of 150 nm and the reflection layer of an AlCr alloy had a thickness of 80 nm.

The evaluation was conducted as in Examples 1 to 5.

As a result, significant deformations of reproduced signal wave shape due to peeling of the layer or formation of cracks were observed. The peak shift due to a flow of the recording layer was as large as 17 $\mu$ sec. The bit error rate was as large as $1/10^4$.

It was considered that since the first protecting layer was of crystalline ZnS having a large thermal conductivity, crystal grain growth of the recording layer occurred during repetition of erase and write, resulting in a low repetition durability.

Comparative Example 5

A phase change optical recording medium having the structure of a transparent substrate (1)/a first transparent dielectric protecting layer (2)/a recording layer (3)/an adhesion promotion layer (4)/a second transparent dielectric protecting layer (5)/a reflection layer (6)/a UV-cured resin protecting layer (7) was manufactured as in Example 1 except that the second protecting layer was a crystalline $SiO_2$ layer with a thickness of 18 nm and the reflection layer of an AlCr alloy had a thickness of 80 nm. The $SiO_2$ layer was formed by radio frequency sputtering with an $SiO_2$ target in an Ar gas atmosphere. The ratio of Si to O in the $SiO_2$ is considered to be deviated from the stoichiometric ratio of 1:2 but the precise ratio could not be determined. The transparency of the $SiO_2$ layer was excellent and the refractive index of the layer was 1.50.

The evaluation was conducted as in Examples 1 to 5.

As a result, significant deformations of reproduced signal wave shape due to peeling of the layer or formation of cracks were observed. The peak shift due to a flow of the recording layer was as large as 16 $\mu$ sec. The bit error rate was as large as $1/10^4$.

It was considered that since the second protecting layer was of $SiO_2$, the adhesion of the second protecting layer with the ZnS layer or the AlCr reflection layer was poor, so that the heat given to the recording layer was not dissipated and the durability was not excellent.

Comparative Example 6

A phase change optical recording medium having the structure of a transparent substrate (1)/a first transparent dielectric protecting layer (2)/an adhesion promoting layer/a recording layer (3)/an adhesion promotion layer (4)/a second transparent dielectric protecting layer (5)/a reflection layer (6)/a UV-cured resin protecting layer (7) was manufactured. The adhesion promoting layers on both sides of the recording layer were a crystalline ZnS layer having a thickness of 50 nm. The first and second protecting layers were amorphous SiN layers having thicknesses of 120 nm and 20 nm, respectively. The recording layer was the same GeSbTe layer as that of Example 1 and had a thickness of 25 nm. The reflection layer was an AlCr alloy layer as of Example 1 and having a thickness of 80 nm. The SiN layer was formed by radio frequency sputtering with a sintered $Si_3N_4$ target in an Ar gas atmosphere. The ratio of Si to N in the SiN is considered to be deviated from the stoichiometric ratio of 3:4 but the precise ratio could not be determined. The transparency of the SiN layer was excellent and the refractive index of the layer was 2.15.

The evaluation was conducted as in Examples 1 to 5.

As a result, significant deformations of reproduced signal wave shape due to peeling of the layer or formation of cracks were observed. The peak shift due to a flow of the recording layer was as large as 25 $\mu$ sec. The bit error rate was as large as $2/10^4$.

It was considered that provision of the thick ZnS layers on both sided of the recording layer caused deterioration of the repetition durability even in comparison with the sample without any adhesion promotion layer of Comparative Example 1.

Comparative Example 7

A phase change optical recording medium having the structure of a transparent substrate (1)/a first transparent dielectric protecting layer (2)/a recording layer (3)/an adhesion promotion layer (4)/a second transparent dielectric protecting layer (5)/a reflection layer (6)/a UV-cured resin protecting layer (7) was manufactured as in Example 1 except that the first and second protecting layers were of $ZnS.Y_2O_3$, the adhesion promotion layer was an $SiO_2$ layer. The $ZnS.Y_2O_3$ layer was formed by radio frequency sputtering a sintered $ZnS.Y_2O_3$ target ($ZnS:Y_2O_3$=90:10% by mole) in an Ar gas atmosphere.

The evaluation was conducted as in Examples 1 to 5.

As a result, significant deformations of reproduced signal wave shape due to peeling of the layer or formation of cracks were observed. The peak shift due to a flow of the recording layer was as large as 20 $\mu$ sec. The bit error rate was as large as $7/10^5$.

It was considered that the reason for the lower durability was a poorer wettability of the $SiO_2$ layer with the GeSbTe recording layer fused during writing than the ZnS layer.

Comparative Example 8

A phase change optical recording medium having the structure of a transparent substrate (1)/a first transparent dielectric protecting layer (2)/a recording layer (3)/an adhesion promotion layer (4)/a second transparent dielectric protecting layer (5)/a reflection layer (6)/a UV-cured resin protecting layer (7) was manufactured as in Example 1 except that the first and second protecting layers were crystalline $Al_2O_3$ layers having thicknesses of 120 nm and 30 nm, respectively, the recording layer was a GeSbTe layer having a thickness of 25 nm, the adhesion promotion layer was an ZnS layer having a thickness of 15 nm and the reflection layer was an AlCr layer having a thickness of 90 nm. The $Al_2O_3$ layers were formed by radio frequency sputtering a sintered $Al_2O_3$ target in a mixed gas atmosphere of Ar and $O_2$ (1% of $O_2$).

The evaluation was conducted as in Examples 1 to 5.

As a result, significant deformations of reproduced signal wave shape due to peeling of the layer or formation of cracks were observed. The peak shift due to a flow of the recording layer was not excellent but not as bad as 15 $\mu$ sec. The bit error rate was as large as $8/10^5$.

It was considered that the flow of the recording layer was relatively prevented but the peeling between the crystalline layer and the AlCr layer occurred making deformations of reproduced signal wave shape significant.

From the above results, it was confirmed that by providing an adhesion promoting layer of a sulfide having a certain thickness between a chalcogen-containing recording layer and a protecting layer on the side of a reflection layer, in combination with a protecting layer of a transparent amorphous dielectric material, particularly excellent erase and write (overwrite) repetition durability can be obtained.

We claim:

1. A phase change optical recording medium in which writing, reading and/or erasing of information is conducted by utilizing change of phase of a recording layer by irradiation of a light beam, said recording medium comprising:

a substrate;

a first transparent protecting layer of an amorphous dielectric material formed on the substrate;

a recording layer of a chalcogen alloy formed on and contiguous to the first transparent protecting layer;

an adhesion promoting layer formed on the recording layer, said adhesion promoting layer having a thickness of 10 to 30 nm;

a second transparent protecting layer of an amorphous dielectric material formed on the adhesion promoting layer; and a reflection layer formed on the second transparent protecting layer, said reflecting layer being of a crystalline alloy mainly comprising aluminum;

wherein said first and second transparent protecting layers comprise ZnS added with 12 to 35% by mole of $SiO_2$, said first transparent protecting layer having a thickness of 50 to 250 nm, said second transparent protecting layer having a thickness of 5 to 100 nm, said adhesion promoting layer being of ZnS or PbS.

2. The phase change optical recording medium according to claim 1, wherein said recording layer is mainly comprised of Ge, Sb and Te and has a thickness of 5 to 40 nm.

3. The phase change optical recording medium according to claim 2, wherein said reflection layer is mainly comprised of Al and Cr and has a thickness of 30 to 250 nm.

4. The phase change optical recording medium according to claim 1, wherein said reflection layer is mainly comprised of Al and Cr and has a thickness of 30 to 250 nm.

5. A phase change optical recording medium in which writing, reading and/or erasing of information is conducted by utilizing change of phase of a recording layer by irradiation of a light beam, said recording medium comprising:

a substrate;

a first transparent protecting layer of an amorphous dielectric material formed on the substrate;

a recording layer of a chalcogen alloy formed on the first transparent protecting layer;

an adhesion promoting layer formed on the recording layer, said adhesion promoting layer being of a metal sulfide and having a thickness of 10 to 30 nm;

a second transparent protecting layer of an amorphous dielectric material formed on the adhesion promoting layer; and a reflection layer formed on the second transparent protecting layer, said reflecting layer being of a crystalline alloy mainly comprising aluminum, wherein said metal sulfide is PbS.

6. The phase change optical recording medium of claim 5, wherein said recording layer is mainly comprised of Ge, Sb and Te and has a thickness of 5 to 40 nm.

7. The phase change optical recording medium of claim 6, wherein said reflection layer is mainly comprised of Al and Cr and has a thickness of 30 to 250 nm.

8. The phase change optical recording medium of claim 5, wherein said reflection layer is mainly comprised of Al and Cr and has a thickness of 30 to 250 nm.

* * * * *